United States Patent [19]

Blackborow

[11] Patent Number: 5,034,471
[45] Date of Patent: Jul. 23, 1991

[54] SYNTHESIS OF CARBONYL COMPOUNDS
[75] Inventor: John R. Blackborow, Aix en Provence, France
[73] Assignee: BP Chemicals Limited, London, England
[21] Appl. No.: 576,484
[22] PCT Filed: Feb. 15, 1990
[86] PCT No.: PCT/GB90/00252
   § 371 Date: Oct. 2, 1990
   § 102(e) Date: Oct. 2, 1990
[87] PCT Pub. No.: WO90/10022
   PCT Pub. Date: Sep. 7, 1990
[30] Foreign Application Priority Data
   Mar. 3, 1989 [GB] United Kingdom ............... 89400612
[51] Int. Cl.$^5$ ................................................ C08F 8/06
[52] U.S. Cl. .................................. 525/387; 515/333.8
[58] Field of Search ............................. 525/387, 333.8

[56] References Cited
U.S. PATENT DOCUMENTS

| | | | |
|---|---|---|---|
| 3,382,255 | 5/1968 | White | 525/333.8 |
| 3,515,687 | 6/1970 | Listner | 525/333.8 |
| 3,842,010 | 10/1974 | Pappas et al. | 525/332.1 |
| 3,949,018 | 4/1976 | Agouri et al. | 525/269 |
| 4,309,516 | 1/1982 | Schultz et al. | 525/333.2 |

Primary Examiner—Bernard Lipman
Attorney, Agent, or Firm—Brooks, Haidt Haffner & Delahunty

[57] ABSTRACT

Process for producing active carbonyl compounds predominating in aldehyde groups which comprises epoxidizing in the liquid phase polybutenes having at least 50 percent of the unsaturation in the terminal position, with a peroxygen or peroxygen-forming compound and isomerizing the epoxide so formed to obtain the corresponding carbonyl compounds.

5 Claims, No Drawings

SYNTHESIS OF CARBONYL COMPOUNDS

The present invention relates to a process for producing active carbonyl compounds with long hydrocarbyl chains from polyolefins.

It is well known that polyolefins can be oxidised directly either by oxygen or by ozone to form carbonyl compounds. Such processes are described for instance in GB-A-1172818 and EP-A-244616. In these reactions the oxidation results in the scission of the polyolefin chain at the point of the unsaturated linkage thereby (a) reducing the length of the hydrocarbyl chain on the carbonyl compound and (b) giving rise to a mixture of carbonyl compounds, at least one from either side of the unsaturated linkage in the polyolefin.

It is also known to epoxidise polyolefins followed by isomerisation to form carbonyl compounds. However, the products of such a process are usually ketones which are relatively inactive for subsequent reactions therewith due to the presence of bulky substituents on either side of the carbonyl group.

It has now been found that active carbonyl compounds predominating in aldehyde groups can be produced by the epoxidation route by choice of the appropriate polyolefin.

Accordingly, the present invention is a process for producing active carbonyl compounds predominating in aldehyde groups from polybutenes having at least 50% of the unsaturation in the terminal position, the process comprising (a) epoxidising the polybutene in the liquid phase with a peroxygen compound or a compound capable of giving rise to a peroxygen compound under the reaction conditions and (b) isomerising the epoxide formed from step(a) to the corresponding carbonyl compound.

The term "polybutenes" as used wherein is meant to embrace polyisobutenes because the latter are usually produced from feedstock e.g. butadiene raffinate which is a mixture of n-butenes and iso-butene.

By the term, "terminal position" as used herein is meant that at least 50% of the polybutene reactant used has the polymer chain terminating in a $=CH_2$ group. Such a polybutene is also known as high vinylidene polybutene.

By the term "active carbonyl compounds" is meant carbonyl compounds in which the carbonyl function is readily accessible for further reactions such as e.g. amination.

Polybutenes having a high degree of terminal unsaturation are relatively novel compounds and methods of synthesising these have only recently been devised. For instance EP-A-145235 claims and describes such a process. The polybutenes used have a molecular weight in the range of 200-2000.

The epoxidation step is suitably carried out using a peroxygen compound e.g. m-chloroperbenzoic acid, mixture of hydrogen peroxide and sulphuric acid, or, tert-butyl peroxide in the presence of a molybdenum catalyst.

The epoxidation is suitably carried out using a solution of the polybutene in a solvent inert under the reaction conditions such as a chlorohydrocarbon e.g. dichloromethane or carbontetrachloride.

The epoxidation is preferably carried out in an atmosphere inert under the reaction conditions e.g. nitrogen.

The epoxidation reaction can be carried out in the presence of an acidic catalyst which may be organic or mineral acids. Thus, the acid catalyst may be organic or inorganic in nature and may include catalysts such as alumina, silica, aluminosilicates, zeolites, sulphuric acid and the like. Ideally, the epoxidation can be carried out using a hetrogeneous catalyst for ease of isolation of products. For instance, the catalyst may be impregnated upon or be part of a resin or support which can be formed into a column and the epoxidised polybutene passed through said column. Alumina is the preferred catalyst.

The epoxidation reaction is suitably carried out at ambient temperature and pressure, preferably at temperatures below 40° C. It is generally not necessary to purify or isolate the epoxidation products unless the decomposition products from the peroxygen compounds used for epoxidation are undesirable and/or detrimental to the epoxide.

The epoxidised product from step (a) is isomerised to the corresponding carbonyl compound, preferably, in the presence of an acidic catalyst. The acidic catalyst, if used, should be such that it does not readily react with or polymerise the carbonyl compound formed upon isomerisation. In most cases, the same acidic catalyst as is used for epoxidation may be used for this stage.

The isomerisation step (b) is preferably also carried out in an atmosphere inert under the reaction conditions to avoid further oxidation of the carbonyl compounds formed.

The isomerisation is preferably carried out at a temperature of 50°-150° C. and at ambient pressure. The difference in temperature between the epoxidation and isomerisation stages account for the selective nature of the two reactions in spite of using the same or similar catalysts.

The product of the isomerisation step is predominantly aldehydic in nature and is very active due to the fact that the carbonyl function is predominantly at the end of the hydrocarbyl chain.

No purification or separation of the carbonyl product from the isomerisation step is necessary because the epoxidation is a clean reaction as is the isomerisation, especially if the reactions are carried out using a packed column as reactor.

The carbonyl compounds so formed are very versatile and active. For instance, these can be aminated with a primary amine to form an imine and optionally hydrogenated thereafter to form an amine.

The primary hydrocarbyl amines used to react with the carbonyl compounds may be one or more of mono- di- and polyamines which may be aliphatic, alicyclic or aromatic in nature.

Typical examples of amines which can be used in preparing compounds of this invention are diethylenetriamine, di(methylethylene)triamine, triethylenetetramine, tri(methylethylene)tetramine, tri(ethylethylene)tetramine, tetraethylenepentamine, pentaethylenehexamine, ethylenediamine, hexamethylenediamine, o-phenylenediamine, m-phenylenediamine, p-phenylenediamine, alkyl-substituted o-, m- and p-phenylenediamine, dimethylaminomethylamine, dimethylaminoethylamine, dimethylaminopropylamine, dimethylaminobutylamine, dimethylaminoheptylamine, diethylaminomethylamine, diethylaminopropylamine, diethylaminoamylamine, dipropylaminopropylamine, methylpropylaminoamylamine, propylbutylaminoethylamine, dimethylenetrianilinemethylenedianiline, polymethyleneaniline and polyalkylmethyleneaniline.

The reaction of the carbonyl compound with the primary amine is suitably carried out at a temperature in the range of e.g. 50°–200° C. This reaction with primary amine is carried out by continuous removal of water formed during the reaction along with any incidental volatilization of solvents already present in the reaction mixture.

In this reaction the molar ratio of the carbonyl compounds to the primary amine is suitably from 1:1 to 1000:1, preferably from 1:1 to 5:1.

The product of the reaction between the carbonyl compound and the primary amine is a hydrocarbyl imine. Also present in this product are water and solvents especially those used in the prior stages.

The water and solvents are separated from the imine product by e.g. filtration and/or fractional distillation.

The separated imine product is then hydrogenated to form the desired amine.

The hydrogenation of the imine may be carried out under homogeneous or heterogeneous conditions.

The hydrogenation is carried out using catalyst such as Raney nickel, cobalt, ruthenium, rhodium, iridium, platinum and especially platinum on carbon, palladium on carbon, palladium on silica and the like.

The hydrogenation reaction is suitably carried out a pressure of up to 20 MPa, preferably from up to 10 MPa, more preferably from up to 8 MPa.

The hydrogenation reaction is suitably carried out at a temperature from 0° to 200° C., preferably from 50° to 150° C.

Where the hydrogenation reaction is carried out under heterogeneous conditions, the removal of catalyst residues is facilitated. For this purpose, solvent extraction of the amine product can be used. The preferred solvents are aliphatic alcohols or hydrocarbons.

It is, in fact, possible to carry out the imination of the carbonyl compound resulting from the isomerisation step (b) and the hydrogenation of the imine so formed to the corresponding amine in a single reactor thus avoiding the need to separate/purify the imination products of the carbonyl compounds. Thus, the recommended conditions for the imination step above and the hydrogenation step above can be used sequentially in a single reactor without recovering the intermediate imine. Typically, this may be achieved by initially allowing the imination reaction to proceed until upto 60% w/w of the carbonyl compound has been converted to the imine and then hydrogenating in the same reactor the crude imination product so formed, without any separation steps.

Alternatively, by a suitable choice of hydrogenation catalyst both the imination of the carbonyl compound and the hydrogenation of the imine can be performed substantially simultaneously such that any imine formed is instantaneously hydrogenated to the amine. Thus there is no need to wait for any significant quantities of the imine to be formed prior to commencement of the hydrogenation step.

The desired amine can thus be recovered from the reaction products of hydrogenation by filtering off the catalyst and removing the solvent from the filtrate by distillation.

The hydrocarbyl amines of the present invention can be used as lube oil additives, fuel additives and as gasoline detergents.

Alternatively, the active carbonyl compounds can be subjected to a Mannich reaction with a primary or secondary amine and formaldehyde to form a compound having both amino and carbonyl functions.

The carbonyl compounds can thus be contacted with an amine of the formula $HN(R_1)(R_2)$ and formaldehyde.

The amines $HN(R_1)(R_2)$ used to react with the carbonyl compounds may be primary or secondary amino compounds and may be one or more of mono- di- and polyamines in which $R_1$ and $R_2$ are the same or different groups and may be aliphatic, alicyclic or aromatic in nature. The groups $R_1$ and $R_2$ in the amines may also contain polyoxyalkylene groups, hetrocyclic groups, or, the groups HN, $R_1$ and $R_2$ together may form a ring which may carry additional hetero atoms.

Typical examples of amines which can be used in preparing compounds of this invention include, in addition to those recited above for imine formation, the following amines: morpholine, pyridine, piperidine, pyrrole, pyrimidine, pyrroline, pyrazine and pyridazine.

The formaldehyde reactant for this step can be used in the solid, liquid, gaseous or solution form. Typical sources are the normally used paraformaldehyde or formal (a 30% w/w aqueous solution of formaldehyde).

This reaction, normally known as the Mannich reaction, and its mechanism is described, for example, in "Advanced Organic Chemistry" by March, J., Second Edition, pp820–823, published by McGraw-Hill Book Company (1977). This reaction can be catalysed by an acid or a base.

The sequence of addition of the reaction components is not critical although the amine and formaldehyde can be reacted initially at a relatively lower temperature e.g. 60° C. in a solvent such as ethanol, and the carbonyl compounds from the isomerisation reaction can be added and thereafter, the entire mixture heated in a closed system at upto 180° C. If this reaction is carried out in an open reactor, lower temperatures of upto 70° C. are recommended to avoid loss of volatile reactants and products.

For this reaction the molar ratio of amine to formaldehyde to the carbonyl compounds from the isomerisation reaction is respectively 1–2:1–2:1, preferably 1:1:1.

The products of the Mannich reaction are amines containing carbonyl functions. In a preferred case, the value of n in the product (I) is 2. These amine products may be admixed in some cases with by-products of the reaction which e.g. can be corresponding imines. The reaction product can be recovered from the reaction mixture by first washing with water (in the case of acid catalyst) or by a dilute aqueous acid (in the case of a base catalyst) followed by removal of the unwanted low boiling fractions by stripping under vacuum or under an inert gas.

The amino carbonyl compounds can be used as such as additives for lube oils and fuels.

However, if the products of the Mannich reaction are a mixture of amines and imines, such a mixture may be hydrogenated either to convert the imines to amines and/or to convert the carbonyl function in the mixture to the corresponding alcoholic or hydrocarbyl groups. Such hydrogenated products can subsequently be used as additives in lube oils or fuels.

The amine products of the present invention have the further advantage that there is substantially no resin formation during the synthesis thereof. Moreover, use of the high vinylidene polyisobutene reactant such as Ultravis (Regd. Trade Mark) gives a product free from any chlorine residues.

The present invention is further illustrated with reference to the following Examples.

EXAMPLE 1

100 g of a high vinylidene (76%) polybutene Ultravis 2 (Regd. Trade Mark) mol weight Mn 500 and viscosity 190 SSU at 98.9° C. in 200 ml of dichloromethane was epoxidised with m-chloroperbenzoic acid (40 g) in dichloromethane (500 ml) solvent as follows: The m-chloroperbenzoic acid solution was added drop-wise to the polybutene solution over thirty minutes, the solvent being refluxed during this addition. After 4 hours the mixture was cooled to −15° C. and the resulting solids filtered off. This procedure of cooling and filtration was repeated until no more solids separated from the solution at −15° C. The solution, i.e. filtrate was then washed with dilute aqueous sodium carbonate solution and the resulting organic layer collected. The organic layer was then evaporated in a rotary evaporator under vacuum at 100° C. Over 90% conversion of the polybutene to epoxide had occurred as evidenced by $^{13}$Cnmr spectroscopic analysis.

6.5 g of the epoxide so formed was mixed with 0.15 ml of 98 wt % sulphuric acid in n-heptane (100 ml) and the whole mixture refluxed for 4 hours (98° C.). The mixture was then cooled and washed several times with water to remove any excess acid catalyst in the product and then allowed to separate into an aqueous and an organic phase. The organic phase was recovered and volatile fractions stripped off under vacuum in a rotary evaporator at a final temperature of 150° C. Toluene (50 ml) was then added to the resultant residue and the solution stripped off again as previously.

An I.R. spectrum of the residue so formed indicated a notable band at 1720 $Cm^{-1}$ which showed a substantial absence of any epoxide ($^{13}$Cnmr, a sharp signal at 205.6 ppm using tetramethylsilane as reference).

The intensity of the infra-red absorption at about 1720 $cm^{-1}$ alsocorresponded to a carbonyl content of one mole per mole of product using known samples as reference.

EXAMPLE 2

6.16 g of the epoxidised Ultravis polybutene from Example 1 was mixed with 80 ml of toluene and refluxed. 6.3 g of $N,N^1$-dimethyl-1,3-diamino-propane was added over 0.5 hr to the refluxing mixture. The whole mixture was then boiled for 3 hr. Thereafter some of the light distillates were removed from this reaction mixture by distillation. The remaining residual mixture was cooled and transferred to a rotary evaporator immersed in an oil bath at 140° C. Low boiling materials were thus stripped off under vacuum and a heavy viscous residue was collected. This residue contains 1.3% w/w nitrogen but no $N,N^1$-dimethyl-1,3-diamino-propane showing that the desired reaction had occurred.

EXAMPLE 3

A sample (3 g) of the residual product obtained in Example 1 above was mixed with a pre-heated mixture of formal (30% w/w aqueous solution of formaldehyde, 0.4 g) and $N,N^1$-dimethyl-1,2-diaminopropane (0.4 g) saturated with dry HCl gas in ethanol solution. The entire mixture was heated to reflux for 6 hours and then cooled and washed with dilute aqueous sodium hydroxide solution to remove any excess acid in the product. The washed product was allowed to separate into two phases. The organic phase was then recovered by extraction with hexane, and, after removal of the extracting solvent, yielded a viscous liquid residue containing nitrogen. An infra-red spectrum of this product showed absorption in the region of 1750–1700 $cm^{-1}$ showing the presence of a C=O function in the product.

EXAMPLE 4

A. 401 g of high vinylidene (76%) polybutene (Ultravis, Regd. Trade Mark-Ex BP Chemicals Ltd) of average molecular weight 1000 was epoxidised with meta-chloroperbenzoic acid as described in Example 1 above and 384 g of the polybutene epoxide was obtained.

A sample of the product from the above reaction was tested for conversion to epoxide by titration with tetramethylammonium bromide according to known method and epoxide formation was confirmed.

B. (a) 220 g of the polybutene epoxide from (A) was isomerised by heating with 1.5 ml of sulphuric acid in 500 ml of hexane at 70° C. for 5 hr under nitrogen. The resultant product was sequentially washed with dilute alkali and water to obtain a viscous compound which had an infra-red spectrum showing the presence of strong carbonyl band not present in the original unisomerised epoxide product.

(b) 100 g of the epoxide product from (A) above was mixed with 200 ml of hexane and 12 g of Amberlyst 15 (Regd. Trade Mark) acid resin. The mixture was refluxed for 48 hr under nitrogen to isomerise the epoxide. The resultant reaction mixture was filtered and the filtrate evaporated to give a viscous compound which had an infra-red spectrum showing the presence of a strong carbonyl band not present in the unisomerised epoxide product.

C. 100 g of epoxide from (A) was isomerised by mixing with acidic alumina (20 g) in n-octane (100 ml) and refluxing under nitrogen with continuous stirring at 125° C. for 4 hr. The resultant mixture was cooled and filtered and the filtrate placed in a hydrogenation reactor with 20 g of dimethylaminopropylamine in the presence of 3 g of platinum on carbon (% 5 w/w Pt); then the reactor was pressurised with hydrogen to 2.8 MPa (28 bars) pressure. The reactor was maintained at 160° C. for 10 hr with stirring. The hydrogenation reaction mixture was then cooled and filtered. The resultant filtrate was evaporated in a rotary evaporator at 160° C. for 2 hr to remove lighter components and a viscous product was left behind.

The viscous product contained 2.2% w/w nitrogen as measured by elemental analysis and upon examination of its infra-red spectrum showed no carbonyl or imine bands.

The above results show that hydroimination of the carbonyl can take place in a single reactor.

I claim:

1. A process for producing active carbonyl compounds predominating in aldehyde groups from polybutenes having at least 50% of the unsaturation in the terminal position, the process comprising
    (a) epoxidising the polybutene in the liquid phase with a peroxygen compound or a compound capable of giving rise to a peroxygen compound under the reaction conditions and
    (b) isomerising the epoxide formed from step (a) to the corresponding carbonyl compound.

2. A process according to claim 1 wherein the polybutenes used have a molecular weight in the range of 200–2000.

3. A process according to claims 1 or 2 wherein the epoxidation step is suitably carried out using a peroxygen compound which is m-chloroperbenzoic acid, mixture of hydrogen peroxide and sulphuric acid, or, tert-butyl peroxide in the presence of a molybdenum catalyst.

4. A process according to claim 1 wherein the isomerisation is carried out at a temperature of 50°–150° C. and at ambient pressure.

5. A process according to claim 1 wherein the isomerisation is carried out in the presence of an acidic catalyst.

* * * * *